United States Patent
Willems et al.

(10) Patent No.: US 9,255,404 B2
(45) Date of Patent: Feb. 9, 2016

(54) METHODS FOR PRODUCING PRECAST PERVIOUS CONCRETE PANELS

(71) Applicant: THE SPANCRETE GROUP, INC., Waukesha, WI (US)

(72) Inventors: Daniel J. Willems, Hartland, WI (US); John Nagy, Chenequa, WI (US); Alan Antoniewicz, Pewaukee, WI (US); Paul Staroszczyk, Elkhorn, WI (US); Nicholas Passint, Waukesha, WI (US)

(73) Assignee: The Spancrete Group, Inc., Waukesha, WI (US)

( * ) Notice: Subject to any disclaimer, the term of this patent is extended or adjusted under 35 U.S.C. 154(b) by 0 days.

(21) Appl. No.: 14/657,042

(22) Filed: Mar. 13, 2015

(65) Prior Publication Data

US 2015/0184384 A1 Jul. 2, 2015

Related U.S. Application Data

(60) Continuation-in-part of application No. 14/296,776, filed on Jun. 5, 2014, which is a division of application No. 13/915,954, filed on Jun. 12, 2013, now abandoned.

(60) Provisional application No. 61/658,625, filed on Jun. 12, 2012, provisional application No. 61/659,726, filed on Jun. 14, 2012, provisional application No. 61/761,564, filed on Feb. 6, 2013.

(51) Int. Cl.
| | |
|---|---|
| *E01C 11/22* | (2006.01) |
| *E04C 2/04* | (2006.01) |
| *B28B 1/16* | (2006.01) |
| *B29D 99/00* | (2010.01) |
| *E01C 5/00* | (2006.01) |
| *E01C 5/06* | (2006.01) |

(Continued)

(52) U.S. Cl.
CPC . *E04C 2/049* (2013.01); *B28B 1/16* (2013.01); *B29D 99/001* (2013.01); *E01C 5/005* (2013.01); *E01C 5/06* (2013.01); *E01C 11/225* (2013.01); *E04B 5/023* (2013.01); *E04B 5/043* (2013.01); *E04C 2/044* (2013.01); *E04C 2/38* (2013.01); *E04C 2002/005* (2013.01); *Y10T 428/249968* (2015.04)

(58) Field of Classification Search
CPC ....... E01C 11/225; E01C 5/003; E01C 5/006; C04B 2111/00284
USPC .................................................. 404/12, 81, 82
See application file for complete search history.

(56) References Cited

U.S. PATENT DOCUMENTS

| | | |
|---|---|---|
| 1,089,380 A | 3/1914 | McDonald |
| 1,237,542 A | 8/1917 | Morgal |

(Continued)

OTHER PUBLICATIONS

Stormcrete Porous Slab System (http://storm-crete.com/porous_slab_system.html), Aug. 7, 2013 archived webpage.*

(Continued)

*Primary Examiner* — Brian Glessner
*Assistant Examiner* — Daniel Kenny
(74) *Attorney, Agent, or Firm* — Ryan Kromholz & Manion, S.C.

(57) ABSTRACT

Methods directed to a producing precast pervious concrete panels. Each pervious concrete panel has a plurality of layers of concrete mixture, wherein the aggregate used in each layer may be a different size and each layer is compacted after being laid. The method may further include providing a slip-former machine or an extruder machine to lay the layers of pervious concrete mixture.

6 Claims, 5 Drawing Sheets

(51) Int. Cl.
*E04C 2/38* (2006.01)
*E04B 5/02* (2006.01)
*E04B 5/04* (2006.01)
*E04C 2/00* (2006.01)

(56) References Cited

U.S. PATENT DOCUMENTS

| | | |
|---|---|---|
| 1,334,101 A | 3/1920 | Kealey |
| 1,604,992 A | 11/1926 | Gregg et al. |
| 3,724,157 A | 4/1973 | Miram |
| 4,708,516 A * | 11/1987 | Miller .................. 404/31 |
| 6,688,808 B2 | 2/2004 | Lee |
| 7,992,281 B2 | 8/2011 | Järvinen et al. |
| 8,297,874 B2 * | 10/2012 | Krzyzak ................ 404/31 |
| 8,312,690 B1 * | 11/2012 | Klemaske et al. ........ 52/741.41 |
| 8,496,396 B1 | 7/2013 | Allen |
| 8,684,626 B2 | 4/2014 | Tonder et al. |
| 2005/0284095 A1 | 12/2005 | Switzer |
| 2011/0002736 A1 | 1/2011 | Monger et al. |
| 2015/0052842 A1 * | 2/2015 | Shaw .................. 52/600 |

OTHER PUBLICATIONS

Spancrete Corporation, Natural porous multi-type PC specification sheet, Japan, Feb. 20, 2008.
Spancrete Corporation, Double wall toward underground: Panel having both permeability and watertight function, Technical News, Japan, Jan. 10, 2000.
Spancrete Corporation, Hollow core pervious concrete panels photograph, Japan, 2000.

* cited by examiner

METHODS FOR PRODUCING PRECAST PERVIOUS CONCRETE PANELS

RELATED APPLICATIONS

This application is a continuation-in-part of pending U.S. Divisional patent application Ser. No. 14/296,776, filed 5 Jun. 2014, which claims the benefit of pending U.S. patent application Ser. No. 13/915,954, filed 12 Jun. 2013, which claims the benefit of U.S. Provisional Patent Application Ser. No. 61/658,625, filed 12 Jun. 2012; U.S. Provisional Patent Application Ser. No. 61/659,726, filed 14 Jun. 2012; and U.S. Provisional Patent Application Ser. No. 61/761,564, filed 6 Feb. 2013, all entitled, "Precast Pervious Concrete Panels."

BACKGROUND OF THE INVENTION

Pervious concrete is a type of concrete that is highly porous to allow water, for example from precipitation, to pass through the concrete. The use of pervious concrete will reduce runoff from a site and route the runoff into the earth or into a collection system. As such, the use of pervious concrete is consistent with ecologically sustainable construction practices. Pervious concrete may be used for parking lots, sidewalks, driveways, and roadways, as a few non-limiting examples.

The porous nature of pervious concrete is achieved by the materials that are put into the concrete. Specifically, pervious concrete is a mix of course aggregate, cement, water, chemicals and little to no sand. This mixture creates an open-cell structure in the concrete, which allows water to filter though the pervious concrete.

Pervious concrete has historically been used in a "ready mix" fashion, delivered to a jobsite and poured into an on-site form. Pervious concrete is unique in many ways including the long cure time to reach maximum strength; the cure time required to reach full strength is typically 28 days or longer. The pervious concrete material must be covered to reduce moisture loss and temperature controlled during the cure time. During this cure time the product does not provide maximum protection and is prone to dilution from water, cracking from stressing or reduced ultimate strength due to temperature.

SUMMARY OF THE INVENTION

The present invention relates to pervious concrete, and more particularly to precast pervious concrete panels. The panels comprise elements such as at least one lifting member or pocket to promote easier lifting for transporting the panel and at least one aperture for insertion of a connector used to join panels together.

Furthermore, the present invention may be used in association with non-pervious surfacing material as part of a drainage system.

It is further contemplated by the present invention that various ratios of sand and various aggregate sizes may be used for applications requiring different strength characteristics.

One aspect of the present invention provides a preformed pervious concrete panel comprising a top surface; a first pervious concrete layer comprised of a first aggregate having a first maximum aggregate diameter and extending for a first depth downward from the top surface; a second pervious concrete layer comprised of a second aggregate having a second maximum aggregate diameter and extending for a second depth downward from the first aggregate layer; and the first maximum aggregate diameter is different than the second maximum aggregate diameter.

Another aspect according to the present invention is to have the first aggregate maximum diameter in the range of about one-quarter inch, three-eighth inch, one-half inch, or three-quarter inch.

Yet another aspect of the present invention is to have the second maximum aggregate diameter in the range of about one-quarter inch, three-eighth inch, one-half inch, or three-quarter inch.

A further aspect of the proposed preformed pervious concrete panel is to provide the first maximum aggregate diameter in the range of about one-quarter inch and the second maximum aggregate diameter in the range of about three-eighth inch.

The preformed pervious concrete panel may also have the first maximum aggregate diameter in the range of about three-eighth inch and the second maximum aggregate diameter in the range of about one-half inch.

Another aspect of the present invention provides a preformed pervious concrete with a top surface; a first pervious concrete layer, a second pervious concrete layer, and a third pervious concrete layer; the first pervious concrete layer comprising a first aggregate having a first maximum aggregate diameter and extending for a first depth downward from the top surface; the second pervious concrete layer comprising a second aggregate having a second maximum aggregate diameter and extending for a second depth downward from the first pervious concrete layer; the third pervious concrete layer comprising a third aggregate having a third maximum aggregate diameter and extending for a third depth downward from the second pervious concrete layer; and the first maximum aggregate diameter, the second maximum aggregate diameter, and the third maximum aggregate diameter are different from each other.

Another aspect of the present invention is to provide the first maximum aggregate diameter in the range of about one-quarter inch, three-eighth inch, one-half inch, or three-quarter inch.

A further aspect of the invention is to provide the second maximum aggregate diameter in the range of about one-quarter inch, three-eighth inch, one-half inch, or three-quarter inch.

Yet another aspect of the invention is to provide the third maximum aggregate diameter in the range of about one-quarter inch, three-eighth inch, one-half inch, or three-quarter inch.

The first maximum aggregate diameter may be in the range of about one-quarter inch, the second maximum aggregate diameter may be in the range of about three-eighth inch, and the third maximum aggregate diameter may be in the range of about one-half inch.

Further, the first maximum aggregate diameter may be in the range of about three-eighth inch, the second maximum aggregate diameter may be in the range of about one-half inch, and the third maximum aggregate diameter may be in the range of about three-quarter inch.

Yet another aspect of the present invention is to provide a method for producing a pervious concrete panel having a plurality of pervious concrete layers, the method comprising the steps of providing a first concrete mixture comprising a first aggregate having a first maximum aggregate diameter; providing a second concrete mixture comprising a second aggregate having a second maximum aggregate diameter; wherein the first maximum aggregate diameter is different than the second maximum aggregate diameter; laying the second concrete mixture to a second depth; and laying the first concrete mixture on top of the second concrete mixture to a first depth.

The method may further comprise the steps of providing a third concrete mixture comprising a third aggregate having a third maximum aggregate diameter; wherein the third maximum aggregate diameter is different than the first and second maximum aggregate diameters; and laying the third concrete mixture to a third depth prior to laying the second concrete mixture, whereby the second concrete mixture is laid on top of the third concrete mixture.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
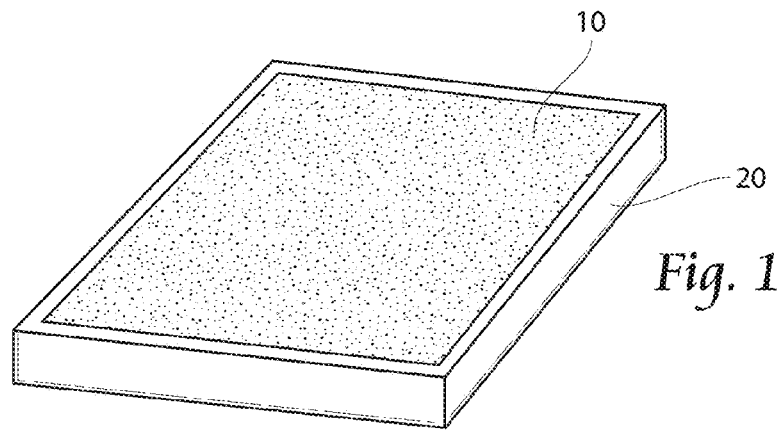
FIG. 1 is a perspective view of a precast pervious concrete panel being formed in a containment vessel.

FIG. 1 shows a precast pervious concrete panel 10 being formed in a containment vessel 20. In this manner, the precast pervious concrete panel 10 can be formed and cured in a controlled environment in lieu of pouring wet cast concrete at a jobsite with uncontrolled environment. It should be understood that while a square containment vessel 20 is shown, the containment vessel 20 and thus the panel 10 may be formed in any shape desired, including, but not limited to, square, rectangular, circular, or elliptical forms. In this manner, the invention allows the pervious concrete to be made into standard sizes or shapes and produced in a controlled environment thereby ensuring better quality, strength and consistency.

Figure 2:
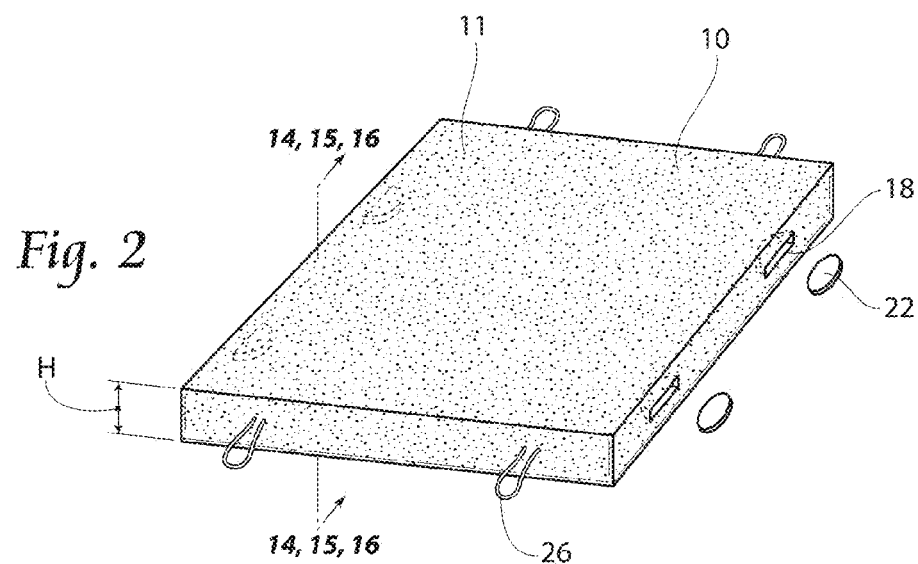
FIG. 2 is a perspective view of a precast pervious concrete panel according to the present invention.
Figure 3:
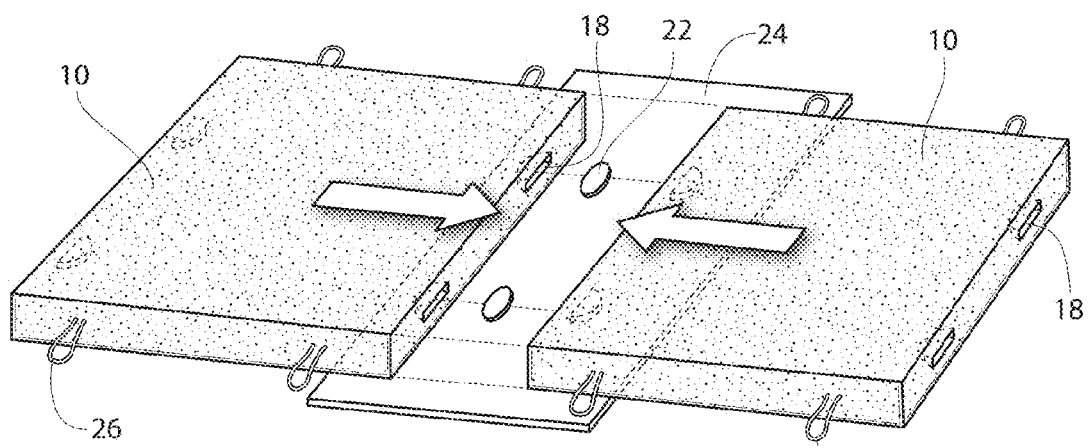
FIG. 3 is a perspective view of two precast pervious concrete panels of FIG. 2 being joined in according to the present invention.

The precast pervious concrete panels 10 are preferably sized and configured to be connected to one another. The precast pervious concrete panels 10 may be connected using any methods known in the art. One such method is shown in FIGS. 2 and 3. FIG. 2 shows an embodiment of a precast pervious concrete panel 10 according to the present invention. The precast pervious concrete panel 10 has a first surface 11 and a second surface 13 (see FIG. 14), whereby the depth from the first surface 11 through the second surface 13 defines a panel height H. The height H is preferably approximately 6 inches.

The panel 10 preferably includes one or more slots 18 cut into the panel 10 at predetermined locations along one or more sides of the panel 10. The slots 18 are preferably sized and configured to accept a connecting member 22. FIG. 3 shows a pair of precast pervious concrete panels 10 being connected to one another. As shown in FIG. 3, it should be understood that two adjacent precast pervious concrete panels 10 should each have corresponding slots 18 to accept a connecting member 22. The number of slots 18 and connecting members 22 may be as few or as numerous as desired.

The connecting member 22 may take any form known in the art and may be made of any material known in the art. In the illustrated embodiment of FIG. 3, the connecting member 22 has a generally oval shape and is made of Korlath. The joint between the precast pervious concrete panels 10 may be dry fitted or a bonding material, such as epoxy, may be used to secure the adjacent precast pervious concrete panels 10. If used, the bonding material may be used along the entire joint or only at the locations of the slots 18 and connecting members 22.

A panel of strip material 24 may be provided under one or more joints between adjacent precast pervious concrete panels 10. The use of the strip material 24 under the joints will reduce stress concentration at the joint connection by dissipating the load bearing, ensure debris is not pinched between panels 10, and allow the panels 10 to slide easily together. If used, the strip material 24 may take any form known in the art and may be made of any material known in the art. In the illustrated embodiment the strip material 24 is generally rectangular and is made of Korlath.

As shown in FIG. 2, each precast pervious concrete panels 10 may also include one or more lifting members 26. In the embodiment shown in FIG. 2 the lifting members 26 take the form of steel cable loops. However, the lifting members 26 may take any form known in the art, and may be attached to the precast pervious concrete panel 10 using any means known in the art.

Figure 4:
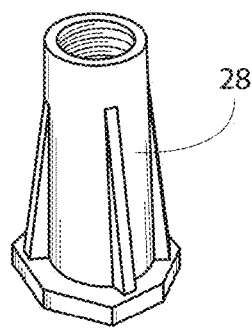
FIG. 4 is a perspective view of an insert which may be used with the present invention.
Figure 5:
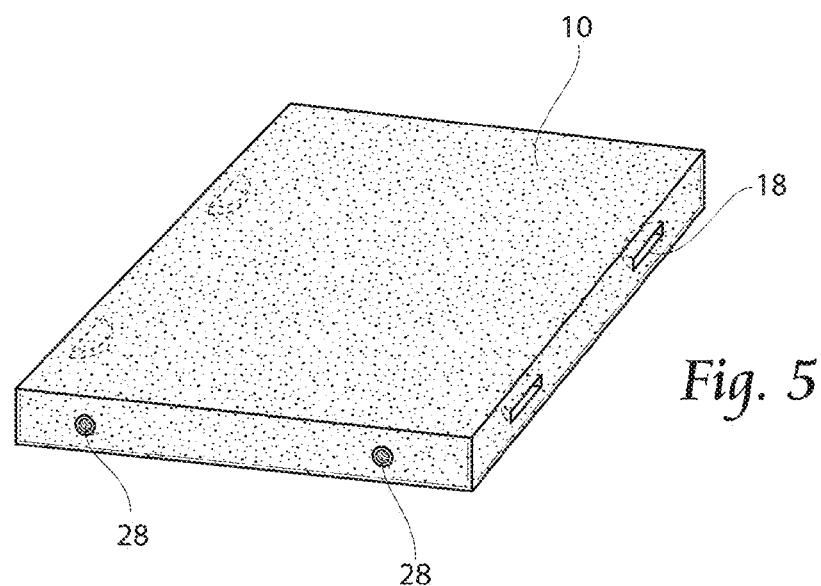
FIG. 5 is a perspective view of the insert of FIG. 4 incorporated in a precast pervious concrete panel according to the present invention.

For example, as shown in FIGS. 4 and 5, it is contemplated that the lifting members 26 may take the form of one or more receptacles embedded in the precast pervious concrete panel 10. The receptacle may take any form known in the art including, but not limited to a female connector 28 sized and configured to have a male member (not shown) threaded into the female connector 28. The male member may take any form known in the art and may be used to lift the precast pervious concrete panel 10. Although any number of such lifting members may be utilized, it is contemplated that in one embodiment four female connectors 28 would be embedded in each precast pervious concrete panel 10. The precast pervious concrete panel 10 could then be lifted by a male member threaded into the female connector 28.

Figure 6:
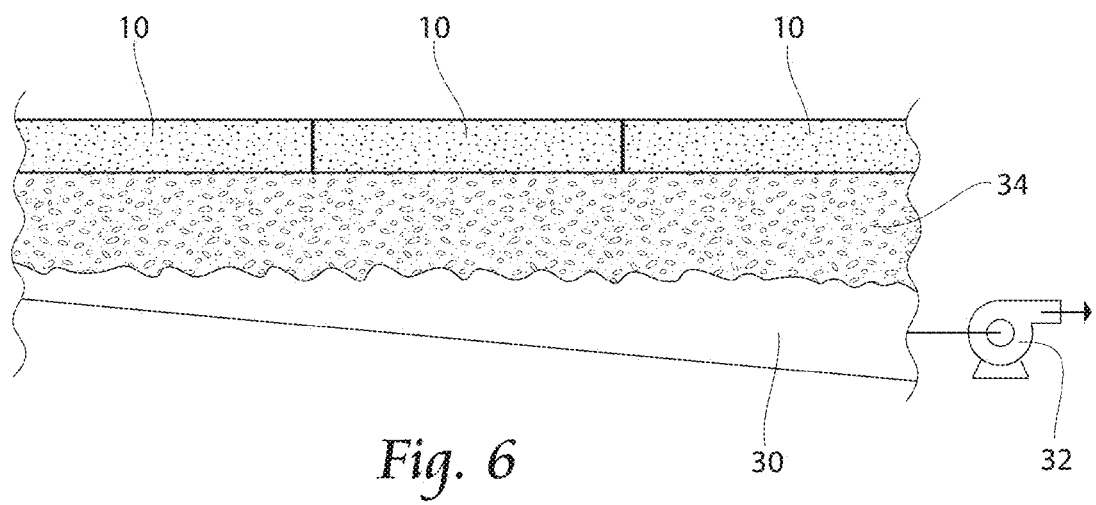
FIG. 6 is a side view of a water collection system incorporating three of the precast pervious concrete panels of FIG. 2.

As shown in FIG. 6, one or multiple precast pervious concrete panels 10 can be combined in a collection system allowing collection/reuse of water passing through the precast pervious concrete panels 10. In such a system a means of collecting water, such as a cistern 30, is placed beneath the precast pervious concrete panels 10. The cistern 30 may be placed directly underneath the panels 10 or may be separated from the panels 10 by a drainage material 34 such as gravel as shown in FIG. 6. As shown in FIG. 6, if desired, the collection system may include a pump 32 to take water from the cistern 30 to distribute the collected water to a desired location.

Figure 9:
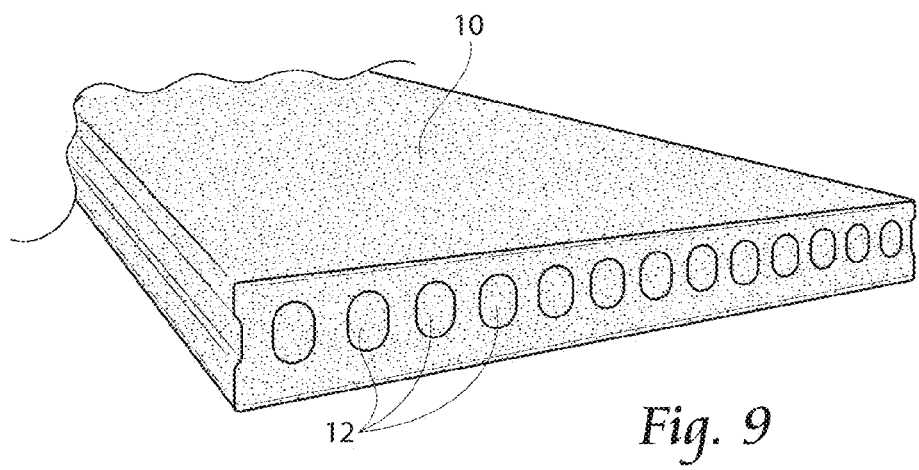
FIG. 9 is a side perspective view of a precast pervious concrete panel having a hollow core according to the present invention.

It is further contemplated that the precast pervious concrete panels 10 may be formed using any means known in the art. For example, and not by way of limitation, the precast pervious concrete panels could be formed on a slip-forming or extruder machine. This would produce a precast pervious concrete panel 10 with multiple hollow channels 12 running through the panel 10 as shown in FIG. 9. This would reduce weight of the panels and material consumption by approximately 20-40%.

Figure 7:
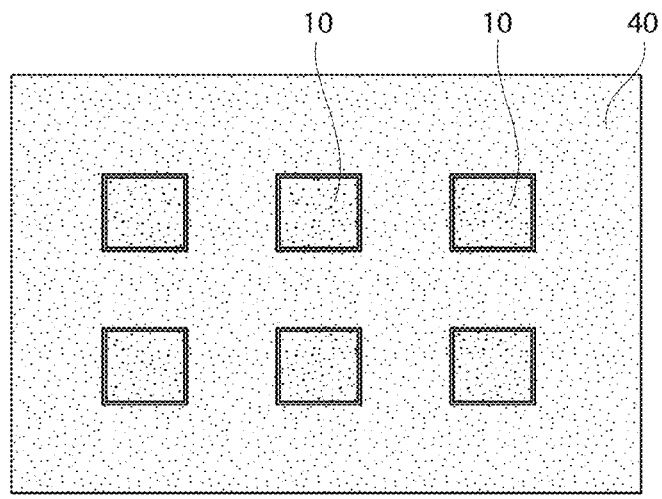
FIG. 7 is a top plan view of a concrete system incorporating conventional concrete and one or more of the precast pervious concrete panels of FIG. 2.
Figure 8:
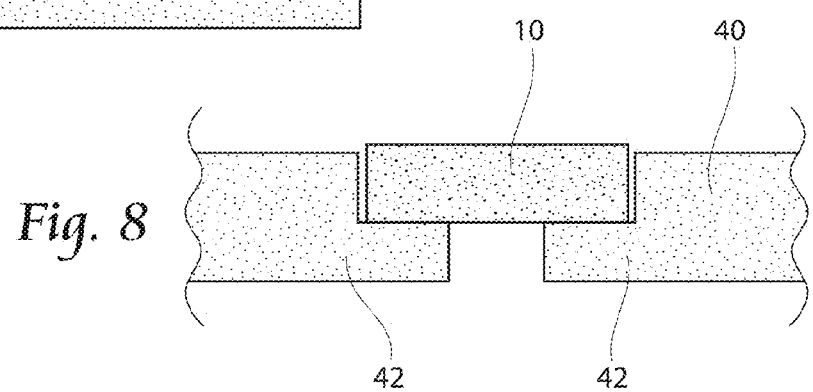
FIG. 8 is a cross sectional view of a portion of the system of FIG. 7.

It is further contemplated that precast pervious concrete panels 10 may be used as inserts to be used in combination with traditional concrete or asphalt as shown in FIG. 7. It is further contemplated that traditional concrete or asphalt may be used as inserts to be used in combination with precast pervious concrete panels 10, in FIG. 7. In this manner, conventional concrete 40 could be cast in place, leaving space to insert the precast pervious concrete panels 10. Preferably, conventional concrete 40 would be cast with a ledge 42 so that the precast pervious concrete inserts 10 could sit on the ledge 42 as shown in FIG. 8. This would reduce costs as compared to using pervious concrete alone, and would increase drainage as opposed to using only conventional concrete. The precast pervious concrete panels 10 could be placed in a decorative pattern or arrangement if desired. To that end, if desired, the precast pervious concrete panels 10 could be integrally colored.

It is further contemplated that the precast pervious concrete panels 10 could be reinforced using any means known in the art including, but not limited to, embedding rebar, fibers or mesh in the precast pervious concrete panels 10.

Figure 10:
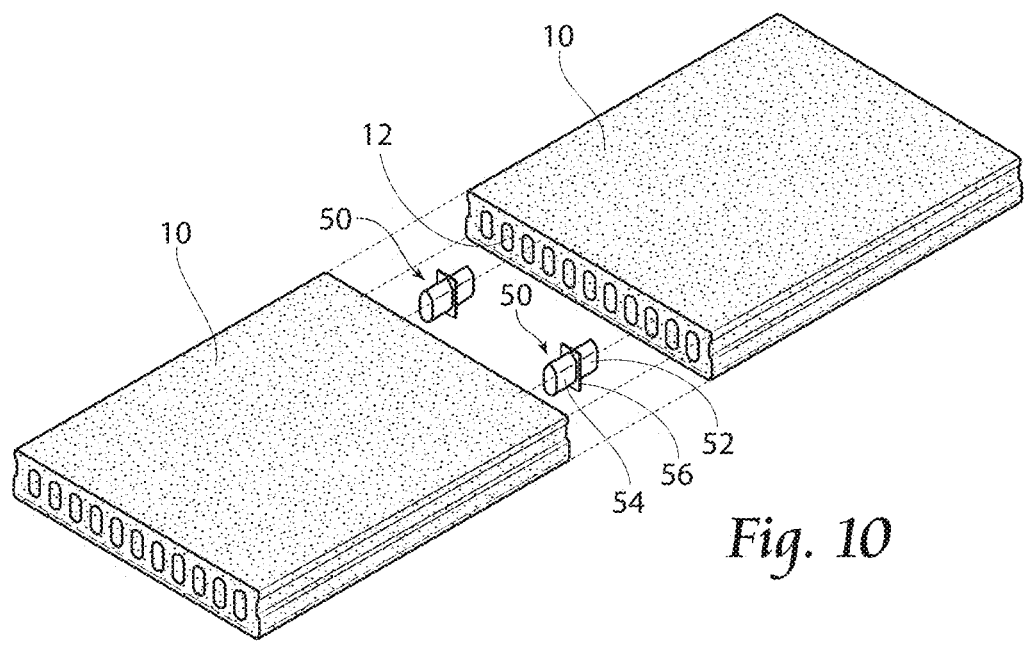
FIG. 10 is an exploded perspective view of a system incorporating two of the precast pervious concrete panel of the present invention and a connector member connecting the panels.
Figure 11:
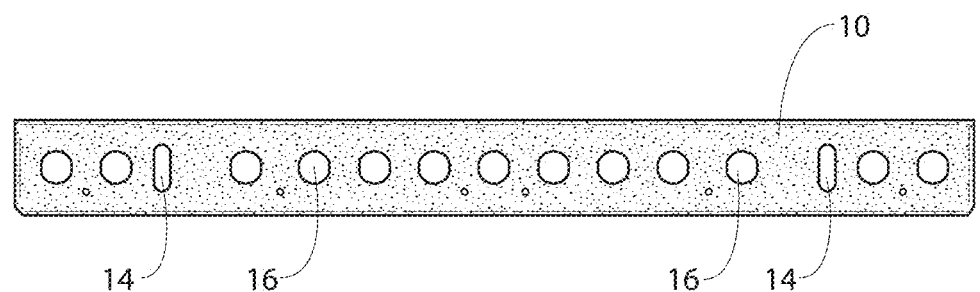
FIG. 11 is an alternative arrangement of a hollow core according to the present invention.
Figure 13:
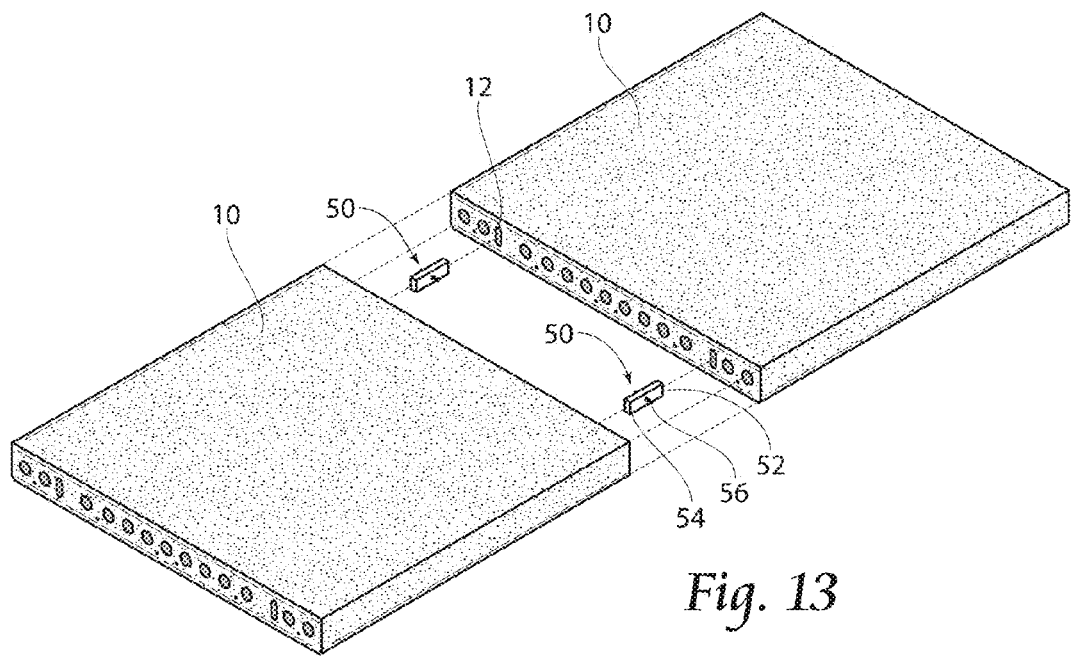
FIG. 13 is an exploded perspective view of a system incorporating two of the precast pervious concrete panel of the present invention and the connector of FIG. 12 connecting the panels.

It is further contemplated that the precast pervious concrete panels 10 may be connected in a manner as shown in FIG. 10, with further reference to FIG. 13 illustrating various aperture and connector shapes. It is contemplated that a first precast pervious concrete panel 10 having at least one first aperture 12 could be connected to a second precast pervious concrete panel 10 having at least one second aperture (hidden). The first and second apertures may be formed in the first and second panel using any means known in the art. For example, and not by way of limitation, the first and/or second apertures could be a hollow core extending through the first and/or second panels respectively. It is further contemplated that the first and/or second apertures could be formed in the first and/or second panels. It is contemplated that a connector 50 having a first end 52 sized and configured to fit within and engage the first aperture 12 and a second end 54 sized and configured to fit within and engage the second aperture (hidden) may be utilized to connect the first and second panels 10. It is further contemplated that the connector may include a hard stop 56 such that the first end 52 of the connector 50 will slide into the core of the first panel 10 until it reaches the hard stop 56, the second end 54 of the connector 50 will slide into the core of the second panel 10 until it reaches the hard stop 56. The hard stop 56 will preferably create a gap between the first and second panels. Furthermore, the size of the panel will determine the number of connectors 50, where there could be as few as one or as many as there are apertures in each panel. Additionally, a panel may incorporate apertures of a variety of different shapes or combinations of different shapes. As a non-limiting example, FIG. 11 further illustrates a panel 10 having oval apertures 14 along with circular apertures 16.

Figure 12:
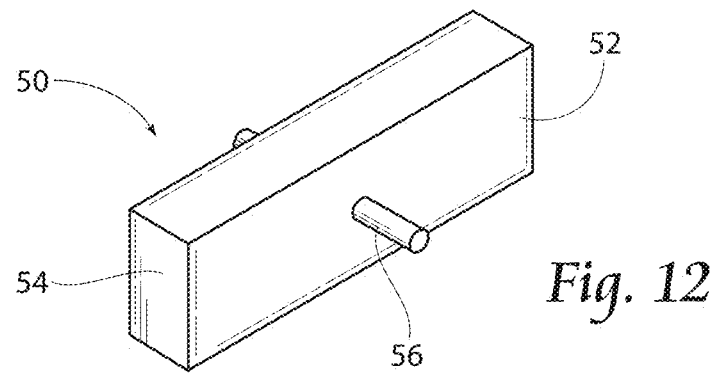
FIG. 12 is an alternative connector member for connecting the panels.

The profile of the connectors 50 may substantially match the cores of the panels 10; they may be round or any other shape used to make the panel's core. For example, the connector 50 in FIG. 10 has a "teardrop" shape and the connector 50 in FIGS. 12 and 13 has a rectangular shape. The connectors 50 can be hollow or solid and are preferably made of a non-corrosive material, including but not limited to plastic or metal.

As outlined above, pervious concrete is a mix of course aggregate, cement, water, and little to no sand. It is further contemplated that the precast pervious concrete panels 10 may be cast using any combination of such materials known in the art. However, it is contemplated that the pervious concrete mixture may be designed to meet the specified strength and permeability of the intended application. Typically, the stronger the precast pervious concrete panel 10, the more material required which reduces the permeability, therefore each application may have a unique mix. The mixes will be classified based off their aggregate size and their sand content. Preferably the pervious concrete material will have a range of aggregate typically varying from about $\frac{1}{8}$-$\frac{3}{4}$" in diameter and sand content ratios up to 10%. For example, a mix for a sidewalk or patio according to the present invention may utilize an aggregate with a diameter in the range of about $\frac{1}{8}$"-$\frac{3}{8}$" and include up to approximately 7% sand content. This mixture would provide a minimum strength of 3,500 psi, an 18-22% void ratio, and infiltration rates exceeding 500 inches/hour. Alternatively, a mix for a highway shoulder or parking stall may employ an aggregate with a diameter in the range of about $\frac{5}{16}$"-$\frac{1}{2}$" and up to approximately 7% sand content. This mixture would provide a minimum strength of 4,000 psi, a 16-20% void ratio, and infiltration rates exceeding 500 inches/hour.

It is further contemplated that it may be desirable to provide a pervious concrete panel including multiple layers, such that the aggregate size for each layer may be independently selectable from the aggregate size in the other layers in the pervious concrete panel.

Figures 14, 15, 16:
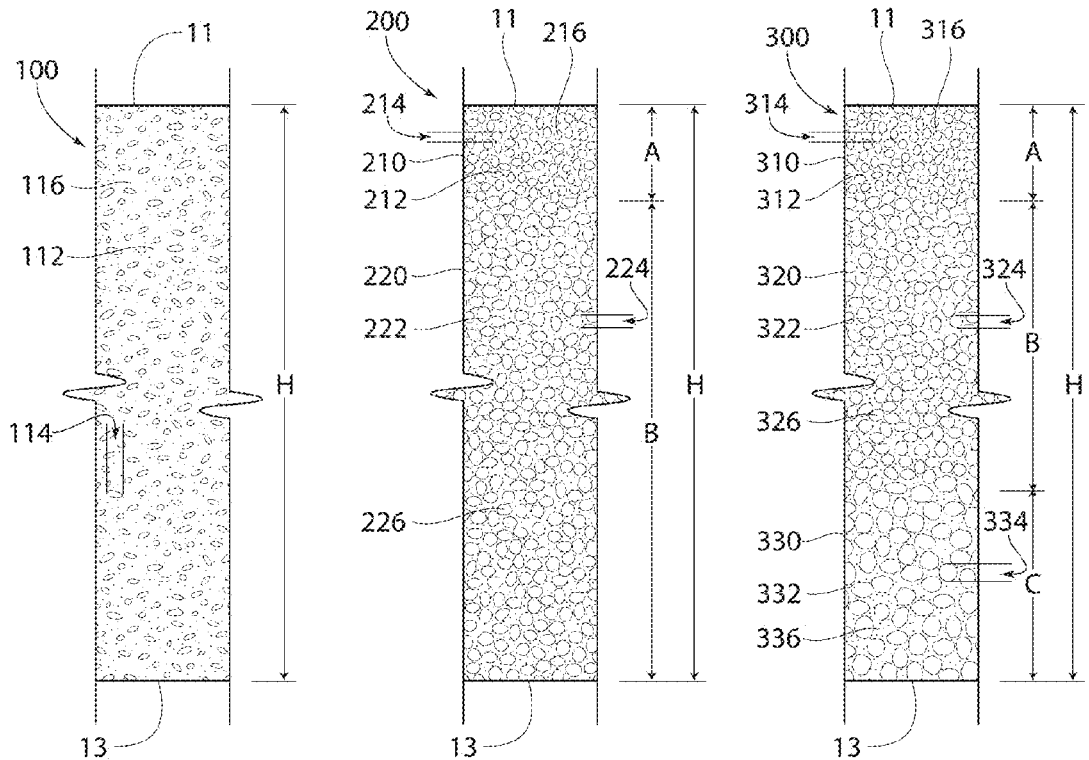
FIG. 14 is a segmented cross-sectional view of the pervious concrete panel of FIG. 2 along line 14-14.
FIG. 15 is an alternative embodiment of the segmented cross-sectional view shown in FIG. 14.
FIG. 16 is an alternative embodiment of the segmented cross-sectional view shown in FIG. 14.

FIGS. 14-16 illustrate various aggregate layering embodiments according to the present invention. For the following discussion, the first surface 11 is also referred to as the top surface and the second surface 13 is also referred to as the bottom surface. It should be understood that the various diameters of aggregate disclosed herein are preferable diameters, but the invention should not be construed as being limited to only those diameters.

FIG. 14 illustrates a first embodiment 100 of a cross-section of the pervious concrete panel 10 along the line 14-14 of FIG. 2. The cross-section is comprised of a concrete mixture 116 with a similarly dimensioned aggregate 112 throughout the entire height H of the pervious concrete panel 10. The aggregate 112 is preferably comprised of aggregate selected from a group having aggregate with a maximum aggregate diameter 114 substantially in the range of about $\frac{1}{4}$", $\frac{3}{8}$", $\frac{1}{2}$", or $\frac{3}{4}$".

FIG. 15 illustrates a second embodiment 200 of the cross-section of the pervious concrete panel 10 along the line 14-14 of FIG. 2. The cross-section is comprised of a first pervious concrete layer 210 having a first concrete mixture 216 with a first aggregate 212 with a first maximum aggregate diameter 214 and extending downward from the top surface 11 for a first depth A, and a second pervious concrete layer 220 comprised of a second concrete mixture 226 having a second aggregate 222 with a second maximum aggregate diameter 224 and extending downward for a second depth B from the first pervious concrete layer 210, whereby the sum of the first depth A and the second depth B equals the height H.

In one embodiment, the first depth A is approximately 1 inch and the second depth B is approximately 5 inches. The first and second maximum aggregate diameters 214,224 are different and are preferably selected from aggregate having a maximum aggregate diameter of substantially about ¼", ⅜", ½", or ¾". In the embodiment shown in FIG. 15, the second maximum aggregate diameter 224 is greater than the first maximum aggregate diameter 214, however, the reverse is contemplated.

FIG. 16 illustrates a third embodiment 300 of a cross-section of the pervious concrete panel 10 along the line 16-16 of FIG. 2. The cross-section is comprised of a first pervious concrete layer 310 comprised of a first concrete mixture 316 having a first aggregate 312 with a first maximum aggregate diameter 314 and extending downward from a top surface 11 for a first depth A, a second pervious concrete layer 320 comprised of a second concrete mixture 326 having a second aggregate 322 with a second maximum aggregate diameter 324 and extending downward for a second depth B from the first pervious concrete layer 310, and a third pervious concrete layer 330 comprised of a third concrete mixture 336 having a third aggregate 332 with a third maximum aggregate diameter 334 and extending downward for a third depth C from the second pervious concrete layer 320.

In one embodiment, the first depth A is approximately 1 inch, the second depth B is approximately inches, and the third depth C is approximately 2 inches. The first, second, and third maximum aggregate diameters 314,324,334 are different from each other and are preferably selected from a group having a maximum aggregate diameter of substantially about ¼", ⅜", ½", or ¾". In the embodiment shown in FIG. 16, the third maximum aggregate diameter 334 is greater than the second maximum aggregate diameter 324, and the second maximum aggregate diameter 324 is greater than the first maximum aggregate diameter 314; however, other combinations of pervious concrete layers, each comprising an aggregate mixture having a maximum aggregate diameter different than the maximum aggregate diameters of the aggregate in the other layers, are contemplated.

A method for producing a pervious concrete panel 10 having a plurality of pervious concrete layers each comprised of aggregate of a different maximum diameter is contemplated. For example, a method to produce the third embodiment 300 of a pervious concrete panel as provided in FIG. 16 preferably comprises the steps as follows. The first concrete mixture 316, the second concrete mixture 326, and the third concrete mixture 336 are provided.

The third concrete mixture 336 is laid along a surface and compacted to the third depth C, thus forming the third pervious concrete layer 330. The second concrete mixture 326 is laid onto the third pervious concrete layer 330 prior to the third concrete mixture 336 fully curing. The second concrete mixture 326 is compacted to the second depth B and forms the second pervious concrete layer 326. The first concrete mixture 316 is laid onto the second pervious concrete layer 320 before the second concrete mixture 326 is fully cured. The first concrete mixture 316 is compacted to the first depth A and forms the first pervious concrete layer 316.

The method may further comprise the step of troweling the first concrete mixture 316 to provide a smooth finish on the first layer 310.

Additionally or alternatively, the different concrete mixtures 316,326,336 may be laid in different orders to form multi-layered concrete panels of various characteristics.

It is contemplated that the second and third concrete layers 326,336 may be comprised of the same concrete mixture, thus forming the two layer concrete panel 200 with the first pervious concrete layer 216 and the second pervious concrete layer 226 as shown in FIG. 15.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method for producing a pervious concrete panel having a plurality of pervious concrete layers, the method comprising the steps of:
providing a first pervious concrete mixture comprising a first aggregate having a first maximum aggregate diameter;
providing a second pervious concrete mixture comprising a second aggregate having a second maximum aggregate diameter;
wherein the first maximum aggregate diameter is different than a second maximum aggregate diameter;
laying the second pervious concrete mixture and compacting the second pervious concrete mixture to a second depth; and
laying the first pervious concrete mixture on top of the second pervious concrete mixture and compacting the first pervious concrete mixture to a first depth.

2. The method of claim 1, further comprising the steps of:
providing a third pervious concrete mixture comprising a third aggregate having a third maximum aggregate diameter;
wherein the third maximum aggregate diameter is different than the first and second maximum aggregate diameters; and
laying the third pervious concrete mixture and compacting the third pervious concrete mixture to a third depth prior to laying the second pervious concrete mixture, whereby the second pervious concrete mixture is laid on top of the third pervious concrete mixture.

3. A method for producing a pervious concrete panel having a plurality of pervious concrete layers. the method comprising the steps of:
providing a first pervious concrete mixture comprising a first aggregate having a first maximum aggregate diameter;
providing a second pervious concrete mixture comprising a second aggregate having a second maximum aggregate diameter;
wherein the first maximum aggregate diameter is different than the second maximum aggregate diameter;
providing a slip-form machine;
laying the second pervious concrete mixture with the slip-form machine and compacting the second pervious concrete mixture to a second depth; and laying the First pervious concrete mixture on top of the second pervious concrete mixture with the slip-form machine and compacting the first pervious concrete mixture to a first depth.

4. The method of claim 3, further comprising the steps of:

providing a third pervious concrete mixture comprising a third aggregate having a third maximum aggregate diameter;

wherein the third maximum aggregate diameter is different than the first and second maximum aggregate diameters; and laying the third pervious concrete mixture with the slip-form machine and compacting the third pervious concrete mixture to a third depth prior to laying the second pervious concrete :mixture, whereby the second pervious concrete mixture is laid on top of the third pervious concrete mixture.

5. A method for producing a pervious concrete panel having a plurality of pervious concrete lavers, the method comprising the steps of:

providing a first pervious concrete mixture comprising a first aggregate having a first maximum aggregate diameter;

providing a second pervious concrete mixture comprising a second aggregate having a second maximum aggregate diameter;

wherein the first maximum aggregate diameter is different than the second maximum aggregate diameter;

providing an extruder machine;

laying the second pervious concrete mixture with the extruder machine and compacting the second pervious concrete mixture to a second depth; and laying the first pervious concrete mixture on top of the second pervious concrete mixture with the extruder machine and compacting the first pervious concrete mixture to a first depth.

6. The method of claim 5, further comprising the steps of:

providing a third pervious concrete mixture comprising a third aggregate haying a third maximum aggregate diameter;

wherein the third maximum aggregate diameter is different than the, first and second maximum aggregate diameters; and laying the third pervious concrete mixture with the extruder machine and compacting the third pervious concrete mixture to a third depth prior to laying the second pervious concrete mixture, whereby the second pervious concrete mixture is laid on top of the third pervious concrete mixture.

\* \* \* \* \*